United States Patent
Martin et al.

(10) Patent No.: US 10,066,558 B2
(45) Date of Patent: Sep. 4, 2018

(54) METHOD AND SYSTEM FOR TORQUE CONTROL

(71) Applicant: Ford Global Technologies, LLC, Dearborn, MI (US)

(72) Inventors: Douglas Raymond Martin, Canton, MI (US); Kenneth James Miller, Canton, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/593,234

(22) Filed: May 11, 2017

(65) Prior Publication Data

US 2017/0241357 A1 Aug. 24, 2017

Related U.S. Application Data

(63) Continuation of application No. 14/746,551, filed on Jun. 22, 2015, now Pat. No. 9,650,977.

(51) Int. Cl.
| | |
|---|---|
| *F02D 41/00* | (2006.01) |
| *F02D 35/02* | (2006.01) |
| *F02D 41/06* | (2006.01) |
| *F02D 41/14* | (2006.01) |
| *F02D 41/34* | (2006.01) |
| *F02D 35/00* | (2006.01) |
| *F02D 41/26* | (2006.01) |

(Continued)

(52) U.S. Cl.
CPC ..... *F02D 41/0085* (2013.01); *F02D 35/0092* (2013.01); *F02D 35/02* (2013.01); *F02D 35/028* (2013.01); *F02D 41/064* (2013.01); *F02D 41/145* (2013.01); *F02D 41/1441* (2013.01); *F02D 41/1448* (2013.01); *F02D 41/1454* (2013.01); *F02D 41/1458* (2013.01); *F02D 41/2406* (2013.01); *F02D 41/26* (2013.01); *F02D 41/3005* (2013.01); *F02D 41/34* (2013.01); *F02D 41/22* (2013.01); *F02D 41/2435* (2013.01); *F02D 2200/1002* (2013.01); *F02D 2200/1004* (2013.01); *Y02T 10/44* (2013.01)

(58) Field of Classification Search
CPC .... F02D 41/00; F02D 41/0085; F02D 41/064; F02D 41/1441; F02D 41/1448; F02D 41/145; F02D 41/1454; F02D 41/1458; F02D 41/26; F02D 41/22; F02D 41/34; F02D 41/2435; F02D 35/02; F02D 35/0092; F02D 2200/1002; F02D 2200/1004; Y02T 10/44
See application file for complete search history.

(56) References Cited

U.S. PATENT DOCUMENTS

| | | |
|---|---|---|
| 4,750,371 A | 6/1988 | Kobayashi et al. |
| 4,811,238 A | 3/1989 | Gerrath et al. |

(Continued)

*Primary Examiner* — Hieu T Vo
(74) *Attorney, Agent, or Firm* — Julia Voutyras; McCoy Russell LLP

(57) ABSTRACT

Methods and systems are provided for detecting air-fuel ratio imbalances across all engine cylinders. In one example, a method (or system) may include indicating cylinder imbalance based on each of the exhaust air-fuel ratio, exhaust manifold pressure, and cylinder torque weighted by a confidence factor, where in the confidence factor is determined based on operating conditions.

20 Claims, 6 Drawing Sheets

(51) Int. Cl.
*F02D 41/30* (2006.01)
*F02D 41/24* (2006.01)
*F02D 41/22* (2006.01)

(56) References Cited

U.S. PATENT DOCUMENTS

| | | |
|---|---|---|
| 5,297,044 A | 3/1994 | Sakaki et al. |
| 5,389,780 A | 2/1995 | Anderson |
| 5,546,793 A | 8/1996 | Gimmler et al. |
| 6,024,070 A | 2/2000 | May et al. |
| 6,668,812 B2 | 12/2003 | Javaherian |
| 6,901,815 B2 | 6/2005 | Torre |
| 7,089,672 B2 | 8/2006 | Noltemeyer |
| 7,586,083 B2 | 9/2009 | Vahabzadeh et al. |
| 7,802,563 B2 | 9/2010 | Behr et al. |
| 8,027,910 B2 | 9/2011 | Ebersole et al. |
| 8,439,012 B2 | 5/2013 | Martin et al. |
| 8,577,645 B2 | 11/2013 | Turin et al. |
| 9,650,977 B2 * | 5/2017 | Martin ............... F02D 41/0085 |
| 9,759,148 B2 * | 9/2017 | Jammoussi ......... F02D 41/1497 |
| 2013/0184969 A1 | 7/2013 | Rollinger et al. |
| 2014/0288802 A1 | 9/2014 | Katayama et al. |
| 2014/0290622 A1 | 10/2014 | Ikeda et al. |
| 2014/0298922 A1 | 10/2014 | Smutzer et al. |
| 2016/0333809 A1 | 11/2016 | Jammoussi et al. |

\* cited by examiner

METHOD AND SYSTEM FOR TORQUE CONTROL

CROSS REFERENCE TO RELATED APPLICATION

The present application is a continuation of U.S. patent application Ser. No. 14/746,551, entitled "METHOD AND SYSTEM FOR TORQUE CONTROL," filed on Jun. 22, 2015. The entire contents of the above-referenced application are hereby incorporated by reference in their entirety for all purposes.

FIELD

The present description relates generally to methods and systems for determining cylinder-to-cylinder torque imbalance in an internal combustion engine of a vehicle.

BACKGROUND/SUMMARY

Engine emissions compliance requires the detection of air-fuel ratio (AFR) imbalances across all engine cylinders. An AFR imbalance between cylinders may occur when the AFR in one or more cylinders is different from the other cylinders due to issues such as intake manifold leakage, fuel injector errors, exhaust gas recirculation errors, and fuel flow delivery issues. In addition to degrading emissions, cylinder-to-cylinder imbalances can result in torque errors that reduce engine performance and vehicle driveability.

One example approach for detecting cylinder-to-cylinder AFR imbalances is shown by Behr et al. in U.S. Pat. No. 7,802,563. Therein, AFR imbalance is identified based on the response of an exhaust gas UEGO sensor at frequencies that are at or above a firing frequency of the cylinders during selected operating conditions. Specifically, when the vehicle is not in transient engine operating condition, imbalance is identified if the integration of high frequency differential signals detected by the UEGO sensor is higher than a threshold. Still other approaches for AFR imbalance detection involve detecting AFR imbalance based on exhaust manifold pressure. However, the inventors herein have recognized potential issues with such methods. As one example, when using exhaust gas sensors, as in the approach of Behr, there may be conditions where cylinder-to-cylinder imbalance is not detected due to insufficient mixing of exhaust gas at the exhaust gas sensor. Further, the exhaust gas sensor may not be able to reliably detect cylinder-to-cylinder imbalance during an engine cold-start condition due to insufficient warm-up of the exhaust gas sensor. As another example, when using exhaust manifold pressure to detect AFR imbalance, the detection may be affected by the distance between the pressure sensor and the cylinder. With increased distance, exhaust gas from other cylinders is more likely to mix with the exhaust gas from the cylinder under estimation. In other words, the reliability of any given approach may vary based on operating conditions. As such, if a cylinder fuel or air injection is adjusted responsive to an indication of AFR imbalance during conditions when the sensor output is not reliable, further AFR and torque issues may be generated.

In one example, the issues described above may be at least partly addressed by a method comprising: indicating cylinder-to-cylinder imbalance based on each of exhaust air-fuel ratio estimated by an exhaust gas sensor, exhaust manifold pressure estimated by a pressure sensor, and individual cylinder torque estimated by a crankshaft torque sensor. In this way, cylinder-to-cylinder imbalance may be more reliably identified over a broader range of engine operating conditions over a given drive cycle.

As one example, each of exhaust AFR, exhaust manifold pressure, and individual cylinder torque may be estimated at different operating conditions over a given drive cycle. Cylinder-to-cylinder imbalance may be identified by weighting each of the estimated exhaust AFR, the estimated exhaust manifold pressure, and the estimated individual cylinder torque with a confidence factor. The confidence factor may be adjusted based on the type of estimation and the operating condition at which the type of estimation was performed. For example, the confidence factor of an imbalance estimation based on the output of an exhaust gas sensor may be decreased during conditions when exhaust mixing is lower, and increased during conditions when exhaust mixing is higher. The confidence factor of an AFR estimation based on the output of a pressure sensor may be decreased as the distance between the pressure sensor and the exhaust valve of the cylinder is greater than a threshold, and increased if the distance is smaller than the threshold. Likewise, the confidence factor of an imbalance estimation based on the output of a crankshaft torque sensor may be increased during cold start, and decreased during steady state operation. As a result, a cylinder-specific imbalance estimate collected during a drive cycle at less reliable conditions may be weighted less while a cylinder-specific imbalance estimate collected during the drive cycle at more reliable conditions may be weighted more. As such, the method allows shortcomings of any single estimation approach to be overcome, improving the overall accuracy and reliability of the cylinder imbalance estimation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
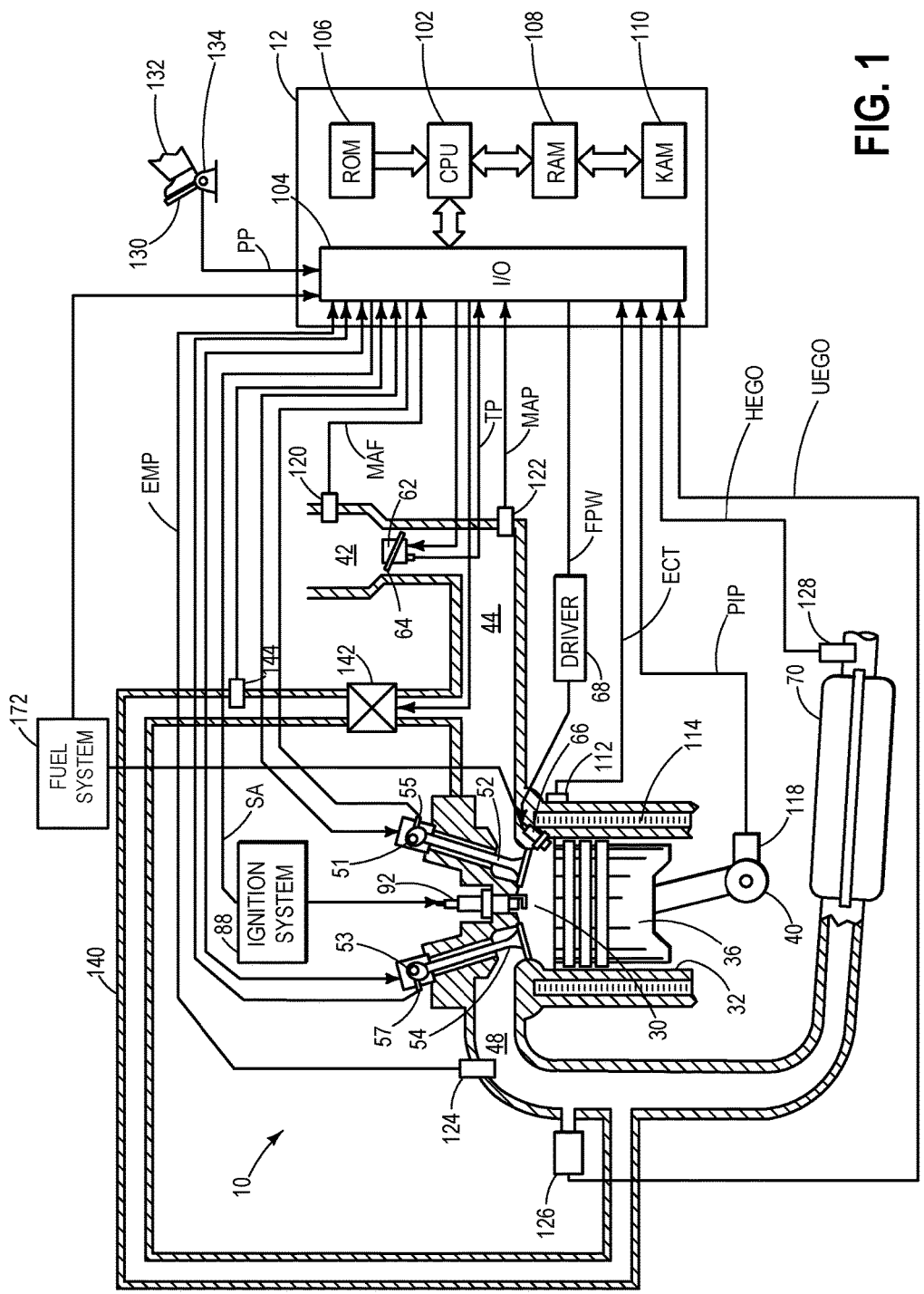
FIG. 1 shows a schematic depiction of an example engine system.
Figure 2:
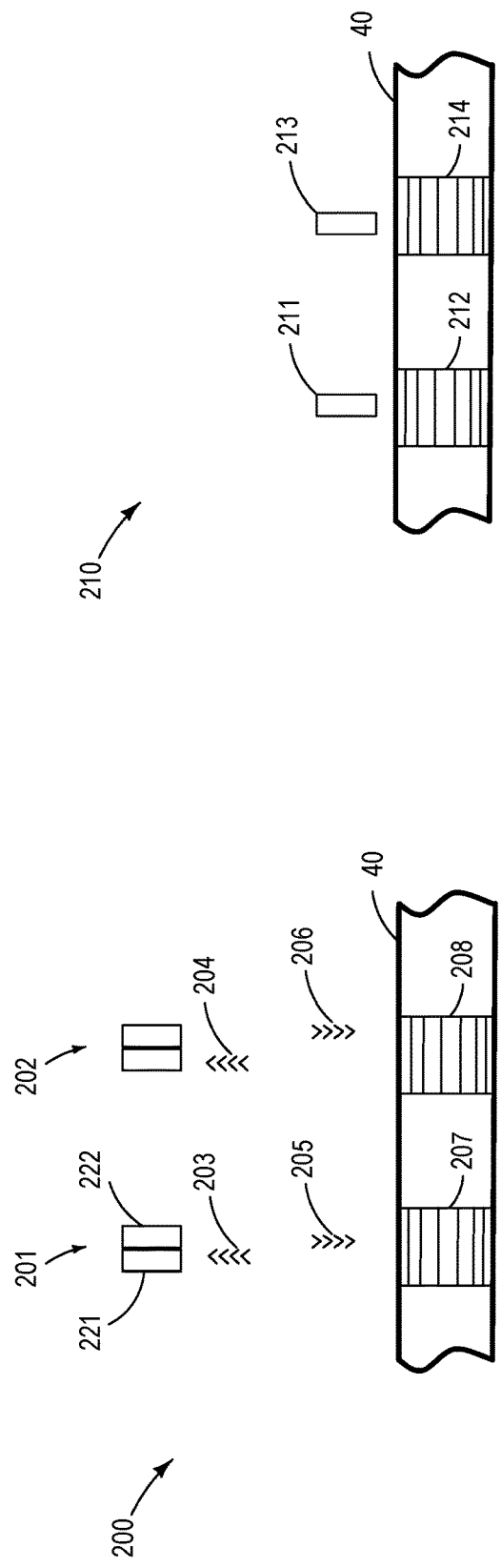
FIG. 2A and FIG. 2B show schematic depictions of a laser crankshaft torque sensor and a magnetic crankshaft torque sensor.
Figure 5:
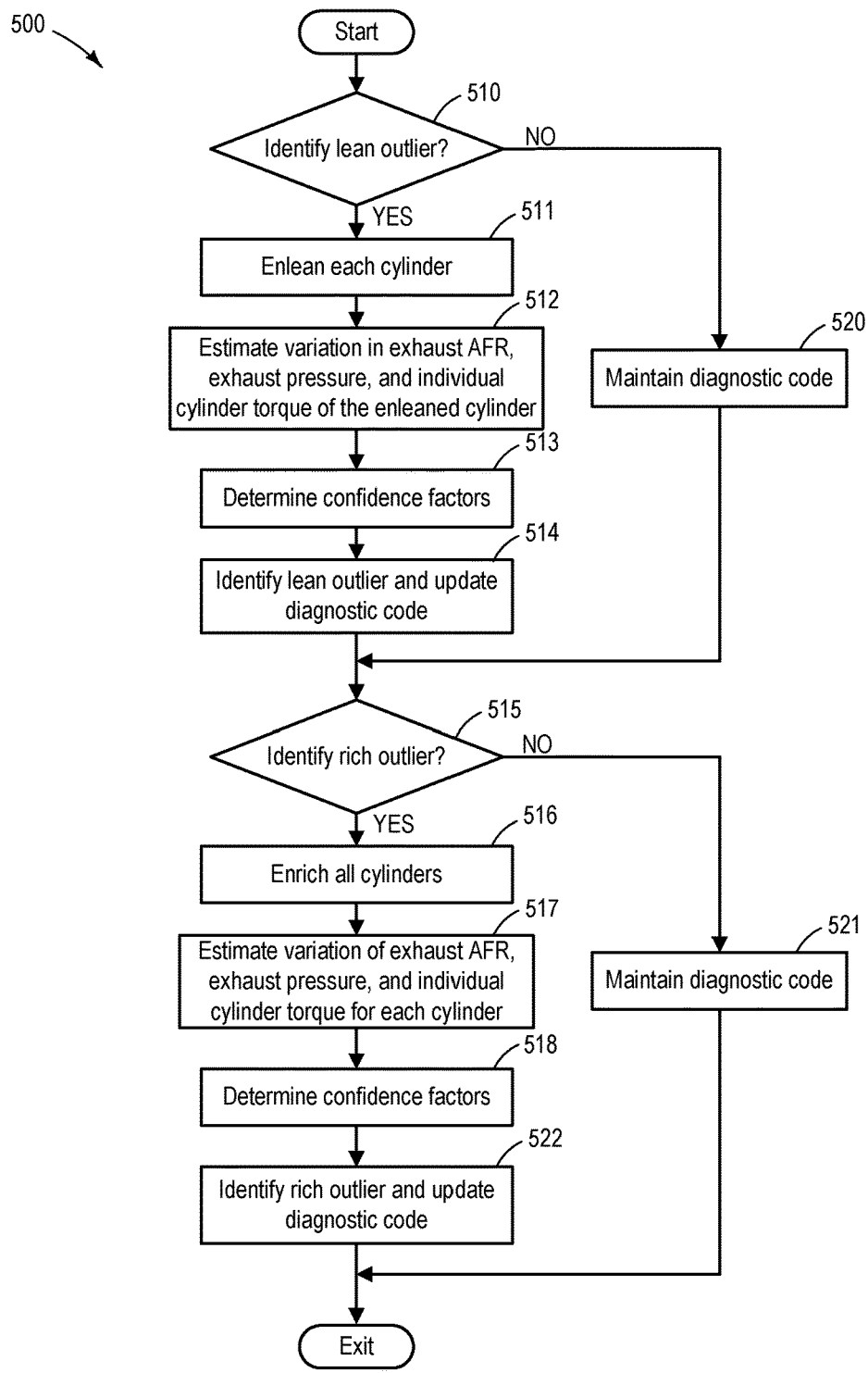
FIG. 5 shows an example method for intrusively identifying cylinder-to-cylinder imbalance.
Figure 6:
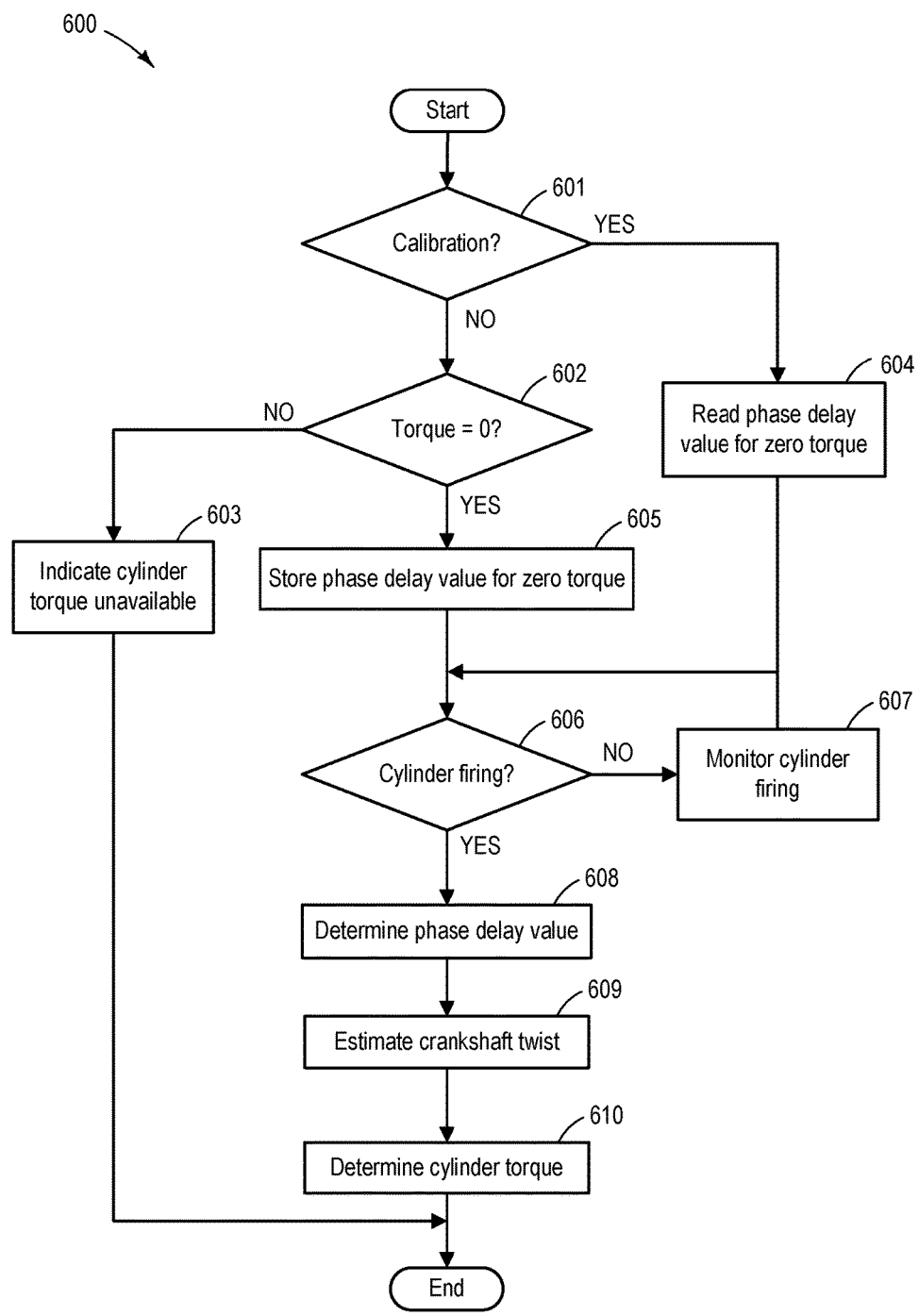
FIG. 6 shows an example method for estimating individual cylinder torque with a laser or a magnetic crankshaft torque sensor.

The following description relates to systems and methods for identifying cylinder-to-cylinder imbalance in a vehicle. FIG. 1 shows a schematic depiction of one cylinder in a multi-cylinder engine system. The engine system may comprise an exhaust gas sensor for sensing the exhaust AFR, a pressure sensor for sensing the exhaust manifold pressure, and a crankshaft torque sensor for sensing the individual cylinder torque. A crankshaft torque sensor using lasers and a crankshaft torque sensor using hard-drive magnetic pickup technology are shown in FIG. 2A and FIG. 2B, respectively. An engine controller may be configured to perform a control routine, such as the example routines of FIGS. 3-4, to identify cylinder-to-cylinder imbalance based on the sensed data. These may include passive or intrusive imbalance diagnosis methods, as shown at FIGS. 5-6. By weighting the data collected from the various sensors differently, based on the operating conditions at which the data was sensed, the reliability of cylinder imbalance estimates is improved.

FIG. 1 illustrates a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Crankshaft 40 may also be coupled to a starter motor via a flywheel to enable a starting operation of engine 10. Further, a crankshaft torque sensor may be coupled to crankshaft 40 for monitoring engine torque. In one example embodiment, the torque sensor may be a laser torque sensor (as shown in FIG. 2A) or a magnetic torque sensor (as shown in FIG. 2B). Still other torque sensors may be used. As elaborated at FIGS. 3-4, an engine controller may infer cylinder torque imbalance based on the weighted output of the torque sensor.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

A pressure sensor 124 may be coupled to exhaust passage 49 downstream of exhaust valve 54 and upstream of emission control device 70. Pressure sensor 124 is preferably positioned close to exhaust valve 54 to measure the exhaust manifold pressure (EMP). In one embodiment, pressure sensor may be a pressure transducer. As elaborated at FIGS. 3-4, an engine controller may infer cylinder torque imbalance based on the weighted output of the pressure sensor.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a NOx, HC, or CO sensor. In one embodiment, upstream exhaust gas sensor 126 is a UEGO configured to provide output, such as a voltage signal, that is proportional to the amount of oxygen present in the exhaust. Controller 12 uses the output to determine the exhaust gas air-fuel ratio. As elaborated at FIGS. 3-4, an engine controller may infer cylinder torque imbalance based on the weighted output of the exhaust gas sensor.

Emission control device 70 is shown arranged along exhaust passage 48 downstream of exhaust gas sensor 126. Device 70 may be a three way catalyst (TWC), configured to reduce NOx and oxidize CO and unburnt hydrocarbons. In some embodiments, device 70 may be a NOx trap, various other emission control devices, or combinations thereof.

A second, downstream exhaust gas sensor 128 is shown coupled to exhaust passage 48 downstream of emissions control device 70. Downstream sensor 128 may be any suitable sensor for providing an indication of exhaust gas air-fuel ratio such as a UEGO, EGO, HEGO, etc. In one embodiment, downstream sensor 128 is a HEGO configured to indicate the relative enrichment or enleanment of the exhaust gas after passing through the catalyst. As such, the HEGO may provide output in the form of a switch point, or the voltage signal at the point at which the exhaust gas switches from lean to rich.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; exhaust manifold pressure (EMP) from pressure sensor 124; engine coolant temperature (ECT) from temperature sensor 112 coupled to cooling sleeve 114; a profile ignition pickup signal (PIP) from Hall effect sensor 118 (or other type) coupled to crankshaft 40; a cylinder torque from the crankshaft torque sensor coupled to crankshaft 40; throttle position (TP) from a throttle position sensor; and absolute manifold pressure (MAP) signal from sensor 122. Engine speed signal, RPM, may be generated by controller 12 from signal PIP. Controller 12 also may employ the various actuators of FIG. 1 to adjust engine operation based on the received signals and instructions stored on a memory of the controller.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Turning to FIG. 2A, an example laser crankshaft torque sensor 200 is shown. The torque sensor is positioned in the torque-bearing region of the crankshaft. For example, the torque sensor may be positioned between the last cylinder of the engine block and the shaft's engagement to a gear that is coupled to a damper or a transmission. The torque sensor may comprise at least two sets of laser/detector and at least two encoders. As an example, FIG. 2A shows a torque sensor comprising two sets of laser/detector (201 and 202) and two encoders (207 and 208). The laser/detector sets are fixed to a structure holding crankshaft 40 and positioned at a common distance from crankshaft 40. The lasers and detectors are arranged facing towards crankshaft 40. The encoders are applied circumferentially to crankshaft 40. Each encoder has a code (e.g., a bar code) configured as multiple alternating black and white lines parallel to crankshaft 40. In another embodiment, encoders 207 and 208 may join each other and form a single encoder.

Each laser/detector set measures the position of the crankshaft by intermittently sending laser pulses to the corresponding encoder and receiving laser pulses reflected from the encoder. In an example, each laser/detector set comprises one laser 222 and one detector 221 positioned in contact with each other. Laser 222 in laser/detector set 201 sends laser pulses 205 to encoder 207, and the detector 221 in laser/detector set 201 receives reflected laser pulses 203 from encoder 207. Twist in crankshaft 40 may be estimated by comparing the two measured position signals from the two laser/detector sets. Engine torque may further be calculated based on the estimated twist. An example method of estimating engine torque using the laser torque sensor is shown in FIG. 6.

FIG. 2B shows an example magnetic crankshaft torque sensor 210. Similar to laser torque sensor 200, magnetic torque sensor 210 is positioned in the torque-bearing region of the crankshaft. Magnetic torque sensor 210 comprises at least two hard-drive type magnetic pickups fixed on a structure holding crankshaft 40 and are positioned at a common distance from the crankshaft. Each magnetic pickup points to a corresponding encoder attached circumferentially to crankshaft 40. As an example, FIG. 2B shows a torque sensor comprising two magnetic pickups (211 and 213) and two encoders (212 and 214). Magnetic pickups 211 and 213 may precisely measure the position of crankshaft 40 at two locations by reading corresponding encoders 212 and 214. The encoders may be made of plastic with metal layer or durable magnetic material. In an embodiment, encoders 207 and 208 may join each other and form a single encoder.

Twist in crankshaft 40 may be estimated by comparing the measured crankshaft positions from the two magnetic pickups. Engine torque may further be calculated based on the estimated twist. An example method of estimating engine torque based on the magnetic torque sensor is shown in FIG. 6.

Figure 3:
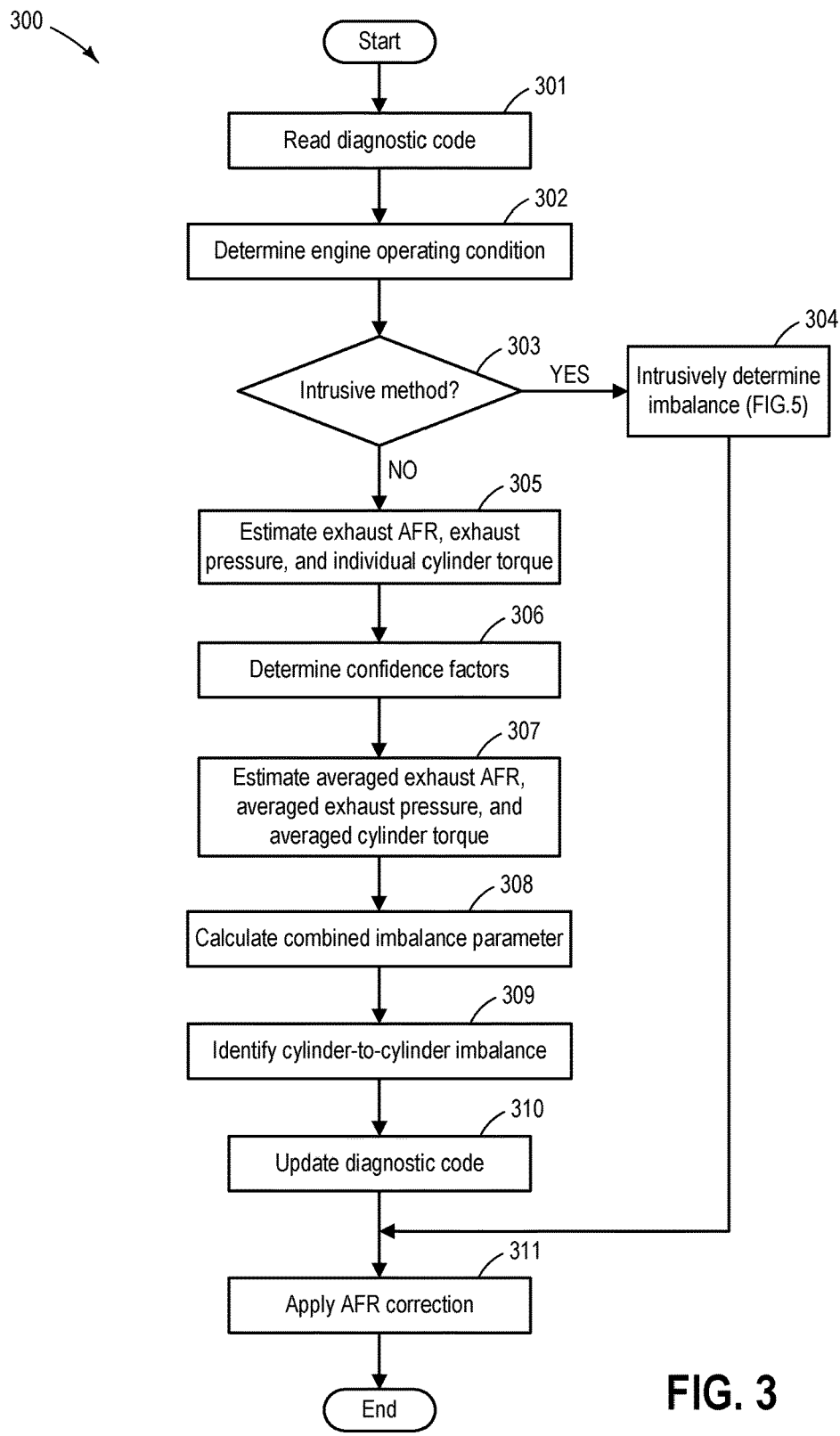
FIG. 3 shows a high level flow chart of an example method for identifying cylinder-to-cylinder imbalance.

Turning to FIG. 3, routine 300 depicts a method of identifying cylinder-to-cylinder imbalance based on combined information of exhaust AFR, exhaust manifold pressure, and the individual cylinder torque. Routine 300 further comprises adjusting engine operation in response to the identified cylinder-to-cylinder imbalance.

Instructions for carrying out method 300 and the rest of the methods included herein may be executed by controller 12 based on instructions stored on a memory of the controller and in conjunction with signals received from sensors of the engine system, such as the sensors described above with reference to FIGS. 1 and 2A-B. The controller may employ engine actuators of the engine system to adjust engine operation, according to the methods described below.

At 301, routine 300 reads a diagnostic code stored in the memory of controller 12. For example, a diagnostic code related to cylinder imbalance may be retrieved from the controller's memory. In an alternate example, the controller may retrieve a cylinder imbalance history from the memory, wherein details regarding each cylinder's propensity for torque errors, as well the directionality (positive or negative) of the torque error is stored. Then, at 302, routine 300 estimates or measures engine operating conditions. The estimated conditions may include, for example, engine speed, torque demand, boost pressure, MAP, engine temperature, combustion AFR, exhaust catalyst temperature, ambient conditions, etc.

At 303, based on the estimated engine operating condition, routine 300 determines whether an intrusive cylinder-to-cylinder imbalance diagnosis should be performed. As an example, the intrusive imbalance diagnosis may be performed during engine idle conditions. As another example, the intrusive imbalance diagnosis may be performed during engine steady-state conditions when operating with medium to low engine load. If the controller determines that intrusive method performing conditions are present, routine 300 moves to 304, wherein the cylinder-to-cylinder imbalance is determined by actively adjusting combustion AFR. The intrusive imbalance method is explained in detail in FIG. 5. If the answer at 303 is NO, routine 300 then moves to 305 and the cylinder-to-cylinder imbalance is passively diagnosed.

At 305, the passive diagnosis of the cylinder imbalance includes estimating exhaust AFR, exhaust manifold pressure, and cylinder torque for each engine cylinder. Specifically, for each cylinder i, exhaust air-fuel ratio $LAM_i$ is estimated by an exhaust gas sensor (such as exhaust gas sensor 126 of FIG. 1), exhaust manifold pressure $P_i$ is estimated by a pressure sensor (such as pressure sensor 124 of FIG. 1), and individual cylinder torque $TQ_i$ is estimated by a crankshaft torque sensor (such as by a laser torque sensor or a magnetic crankshaft torque sensor of FIGS. 2A and 2B).

At 306, based on the estimated operating conditions, confidence factors are determined for each AFR imbalance estimation performed at step 305. Specifically, a first confidence factor $c1$ may be determined for the AFR estimation; a second confidence factor $c2$ may be determined for the estimation of the exhaust manifold pressure; and a third confidence factor $c3$ may be determined for the estimation of the individual cylinder torque. As such, the confidence factor of a given estimation reflects the reliability or accuracy of a cylinder-to-cylinder imbalance estimate based on the given estimation. The confidence factor may be set to a highest value of 1.0 (indicating greatest confidence), or may be set to the lowest value of zero if the estimation is unavailable or not reliable. Further, the confidence factors may be set to any number between zero and one based on the operating condition at which the estimation is performed. A higher confidence factor value indicates that the imbalance estimate is more reliable, while a lower confidence factor value indicates that the imbalance estimate is less reliable. As such, the confidence factor for a given estimation method may vary based on the operating conditions under which the estimation was carried out. Further, the confidence factor may be different for each cylinder. The confidence factors may also be adjusted while keeping the sum of the confidence factors at a constant value, so that measurements between different drive cycles may be compared.

As an example, the first confidence factor $c1$ for the AFR estimation may be decreased when the mixing of exhaust gas at the exhaust gas sensor is below a threshold. In one embodiment, insufficient mixing may be estimated by observing whether an AFR change in certain cylinder may be reflected by the reading of the exhaust gas sensor, for example, during enleanment or fuel cut. The exhaust gas sensor may not have the same sensitivity to all cylinders, because the exhaust gas sensor may be in a location in the exhaust stream that always receives exhaust gas from some cylinders, but not exhaust gas from the other cylinders. As such, the first confidence factor may be different for each cylinder. As another example, the first confidence factor $c1$ may be decreased during engine cold-start conditions, because AFR may not be accurately estimated by the exhaust gas sensor due to insufficient warm-up of the exhaust gas sensor. As another example, the first confidence factor may be decreased when the exhaust temperature is lower than a threshold. As yet another example, the confidence factor may be decreased for the exhaust AFR measured within a predetermined time period after the engine cold start (or a predetermined number of combustion events since a first combustion event of the cold-start). In another example, the first confidence factor may be decreased if the exhaust AFR is estimated during fuel type adjustment (such as when transitioning between a gasoline fuel and an ethanol fuel, or when transitioning from delivering fuel from a first fuel tank to a second fuel tank) or when the fuel type is unknown. Because exhaust AFR cannot be robustly calculated without information of the fuel type, less confidence is given to the first confidence factor $c1$ when the fuel composition cannot be reliably estimated. In yet another example, the first confidence factor may be increased if the engine is in rich operation.

In another example, the second confidence factor for the estimation of exhaust manifold pressure may be decreased with increased distance between the pressure sensor and the exhaust valve of the cylinder. The farther the pressure sensor is from the cylinder, the greater chance that exhaust from other cylinders may mix with the exhaust from the cylinder under estimation. In another example, the second confidence factor may be decreased if the variation of valve timing is within a threshold.

As another example, the third confidence factor may be increased if the engine is in lean operation. As a further example, the third confidence factor may be increased when the first and the second confidence factors are decreased. After the confidence factors are determined, routine 300 goes to 307.

At 307, routine 300 estimates averaged exhaust AFR (LAMavg), averaged exhaust pressure (Pave) and averaged cylinder torque (TQave) for all cylinders. As an example, the estimation may be based on the combustion spark event timing of each cylinder. As another example, the average may be calculated by averaging the estimation acquired at 305. For example, the averaged AFR for an n-cylinder engine may be calculated as:

$$LAMavg = \Sigma_{i=1}^{n} LAM_i \qquad \text{(equation 1)}.$$

At 308, a combined imbalance parameter for each cylinder is calculated based on the confidence factors and the weighted imbalance estimations. As an example, the combined imbalance parameter for the ith cylinder may be calculated by:

$$\text{combined imbalance parameter for ith cylinder} = \qquad \text{(equation 2)}$$
$$c_1 \frac{LAM_i}{LAMavg} + c_2 \frac{P_i}{Pavg} + c_3 \frac{TQ_i}{TQavg}.$$

At 309, one or more cylinders with imbalanced AFR is identified based on a comparison of the combined imbalance parameters calculated for each cylinder. As an example, an imbalanced cylinder may be identified if the combined imbalance parameter for a given cylinder has a larger deviation from the averaged combined imbalance parameter for all cylinders. As another example, one or more imbalanced cylinders may be identified if the deviation of combined imbalance parameter for any of the cylinder from a mean of the combined imbalance parameter for all cylinders is greater than a predetermined threshold. The magnitude of the deviation may correspond to the magnitude of the imbalance, and the sign of the deviation may correspond to the direction of the imbalance. For example, if the combined imbalance parameter for a cylinder is lower than the mean of the combined imbalance parameters (a negative deviation), the cylinder may be considered a rich outlier. As another example, if the combined imbalance parameter for a cylinder is higher than the mean of the combined imbalance parameters (a positive deviation), the cylinder may be considered a lean outlier.

At 310, the diagnostic code is updated for the imbalanced cylinders identified at 309. In an embodiment, the diagnostic code for the imbalanced cylinder may be modified based on the combined imbalanced parameter determined at step 308. For example, the diagnostic code may be updated based on the difference between current combined imbalance parameter and the diagnostic code read at 301. In another embodiment, the diagnostic code may be updated based on the deviation of the combined imbalance parameter of the imbalanced cylinder from the mean combined imbalance parameter of all cylinders. In addition, an imbalance history of the engine cylinders may be updated.

At 311, routine 300 includes applying an AFR correction to the one or more cylinders which have been indicated as imbalanced. For example, an AFR correction may be applied to an identified cylinder based on the identified magnitude and direction of air-fuel imbalance in the identified cylinder. For example, controller 12 may adjust the amount of fuel supplied to cylinders which have been identified as potentially imbalanced. Controller 12 may then continue to monitor air-fuel imbalances in an attempt to correct the air/fuel imbalance in the identified cylinders. Specifically, a fuel injector pulsewidth of a fuel injector actuator of the fuel injector for the imbalanced cylinder is adjusted to provide the corrected fuel injection amount.

Figure 4:
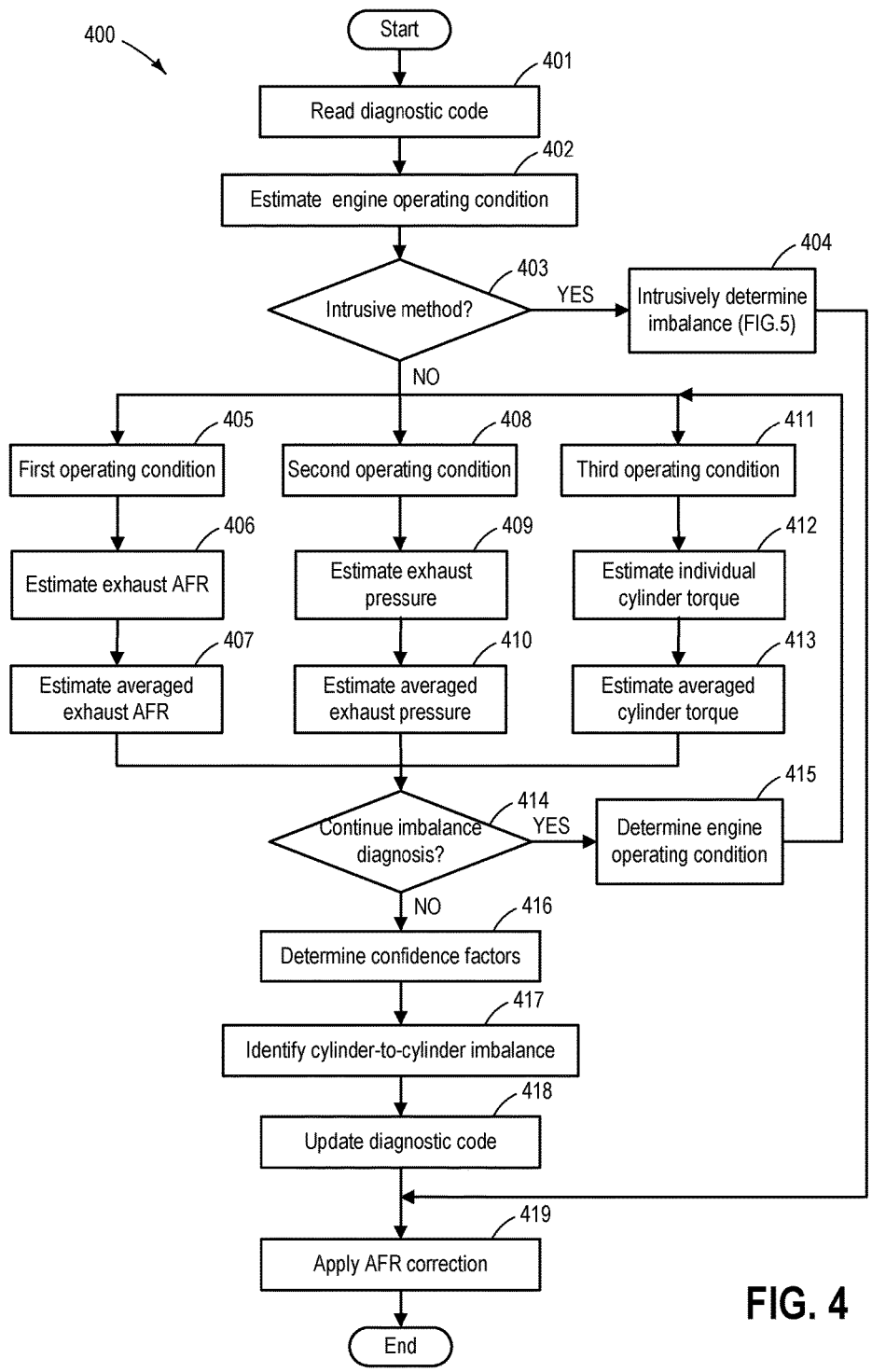
FIG. 4 shows a high level flow chart of an alternative example method for identifying cylinder-to-cylinder imbalance.

FIG. 4 shows an alternative method 400 for identifying cylinder-to-cylinder imbalance. In contrast to the method shown in FIG. 3, in routine 400, different imbalance estimations are performed at different operating conditions. In this way, method 400 may reliably determine the imbalance at a broad range of operating conditions without interrupting engine operation. Moreover, the duration required for identifying the imbalanced cylinders may be reduced.

Similar to steps 301-304 of routine 300 shown in FIG. 3, routine 400 reads the stored diagnostic code at 401, and estimates engine operating conditions at 402. If an intrusive imbalance estimation is determined at 403, routine 400 moves to 404, wherein the engine is actively enleaned to identify lean or rich outliers (as elaborated at FIG. 5). Otherwise, routine 400 determines the type of imbalance estimation to be performed based on operating conditions. Specifically, routine 400 moves to 405 at a first operating condition, to 409 at a second operating condition, and to 413 at a third operating condition. In one example, the first, second, and third conditions are mutually exclusive.

When the engine is at the first operating condition at 405, exhaust AFR for each cylinder is estimated by the exhaust gas sensor at 406. The first operating condition may be a medium load steady-state condition, or an idle steady-state condition. Further, the first operating condition may be when the type of fuel injected into the cylinder is known. For example, during the first condition, the percentage of ethanol in the injected fuel may be known. Further still, the first operating condition may include the exhaust gas at the exhaust gas sensor being sufficiently mixed. The first operating condition may also include the exhaust gas sensor being sufficiently warmed up. The first operating condition may further include rich engine operation (wherein the engine is operated richer than stoichiometry). As such, the first operating condition may include any one of, or any combination of the above-mentioned operating conditions.

At 407, an averaged exhaust AFR is estimated during the first operating condition. As an example, the estimation may be based on the combustion spark event timing of each cylinder. As another example, the average may be calculated by averaging the AFR estimation for each cylinder.

At 408, the first confidence factor is determined for the first operating condition. Similar to step 306 in FIG. 3, the confidence factor may be adjusted to reflect the reliability of the estimation performed at the given operating condition (herein the first operating condition). The confidence factor may be set to the highest value of one to give the greatest confidence to the estimation, and may be set to the lowest value of zero if the estimation is unavailable. Further, the confidence factor may be set to a number between zero and one based on the condition when estimation is performed.

The first confidence factor may be increased with lower combustion AFR, and decreased with a higher combustion AFR. As another example, the first confidence factor may be increased with a better mixing of exhaust gas at the exhaust gas sensor, and decreased with less sufficient mixing of exhaust gas at the exhaust gas sensor.

If the vehicle is at the second operating condition at 409, exhaust pressure is estimated by a pressure sensor positioned at the exhaust manifold at 410. The second condition may be a medium load steady state condition, or an idle steady state condition. Further, the second operating condition may be when the variation in valve timing is within a threshold. Further still, the second operating condition maybe if the distance between the pressure sensor and the exhaust valve of the cylinder is less than a threshold. As such, the second operating condition may include any one of, or any combination of the above-mentioned operating conditions.

At 411, an averaged exhaust pressure is estimated during the second operating condition. As an example, the estimation may be based on the combustion spark event timing of each cylinder. As another example, the average may be calculated by averaging the exhaust pressure estimation for each cylinder.

At 412, the second confidence factor for the second operating condition is determined. The second confidence factor may be increased with less variation in valve timing, and decreased with greater variation in valve timing. The second confidence factor may further be set lower than a threshold if the distance between the pressure sensor and the exhaust valve of the cylinder is greater than a threshold if the distance is smaller than the threshold.

If the vehicle is at the third operating condition at 413, individual cylinder torque is estimated by a torque sensor coupled to the crankshaft at 414. The third condition may be a cold start condition. For example, the cold-start condition may be determined when the exhaust gas temperature is lower than a threshold. Further, the third condition may include when the exhaust gas is not sufficiently mixed at the exhaust gas sensor. Further still, the third condition may be engine lean operation. As such, the third operating condition may include any one of, or any combination of the above operating conditions.

At 415, an averaged engine torque is estimated during the third operating condition. As an example, the estimation may be based on the combustion spark event timing of each cylinder. As another example, the average may be calculated by averaging the torque estimation for each cylinder.

At 416, a third confidence factor is determined for the third operating condition. The third confidence factor may be decreased with a better mixing of exhaust gas at the exhaust gas sensor, and increased with less sufficient mixing of exhaust gas at the exhaust gas sensor. The third confidence factor maybe increased with leaner combustion AFR, and decreased with richer combustion AFR.

At 417, the engine controller determines if there is any change in operating conditions, and accordingly determines whether continued imbalance diagnosis is necessary. In one example, imbalance diagnosis may be discontinued if operating conditions deviate by more than a threshold amount or at a higher than threshold frequency. If a change in operating condition is detected, and continued imbalance diagnosis is necessary, routine 400 moves to 418 to determine current operating conditions. Based on current operating conditions, routine 400 moves to 405, 409, or 413 for further estimation. On the other hand, at 417, if controller determines sufficient data has been acquired and the imbalance may be reliably determined based on the acquired data, routine 400 moves to 419.

At 419, one or more cylinders with imbalanced AFR is determined. Similar to steps 308 and 309 in FIG. 3, a combined imbalance parameter is calculated for each cylinder following equation 2, and then the imbalanced cylinder is identified based on the deviation of combined imbalance parameter for any of the cylinders from the mean of the combined imbalance parameters of all cylinders. The magnitude of the deviation may correspond to the magnitude of the imbalance, and the sign of the deviation corresponds to the direction of the imbalance. Routine 400 then moves to step 420, wherein the diagnostic code is updated similar to step 310 in FIG. 3.

At 421, an appropriate AFR correction is applied based on the determined imbalance. Similar to step 311 in FIG. 3, AFR correction may be applied to an identified cylinder based on the identified magnitude and direction of air-fuel imbalance in the identified cylinder. Further, the AFR correction applied may differ based on operating conditions at which the imbalance is identified. For example, during a first condition, in response to the imbalance, AFR of an imbalanced cylinder may be adjusted via fuel adjustments only. During a second condition, AFR of an imbalanced cylinder may be adjusted via intake air adjustments only. During a third condition, AFR of the imbalanced cylinder may be adjusted via both fuel and intake air adjustments.

Turning to FIG. 5, routine 500 identifies AFR imbalanced cylinders by intrusively enleaning each or all of the cylinders, and monitoring the response of each cylinder. By enleaning each of the cylinders, lean outliers may be identified. By enleaning all cylinders, rich outliers may be identified.

At 510, routine 500 determines if a lean outlier should be identified. As an example, the lean outlier may be identified when the engine operation is significantly affected by enleaning any one (but not all) of the cylinders. If the answer at 510 is YES, routine 500 moves to 511, wherein the AFR is enleaned sequentially for each of the cylinders. If the answer at 510 is NO, routine 500 moves to 520, wherein the diagnostic code is unchanged.

At 511, the method includes increasing the AFR for each of the cylinders sequentially. The order of enleaning may be based on cylinder firing order, or cylinder position along an engine block. In response to increased AFR of the enleaned cylinder, variation in exhaust AFR, exhaust pressure, and individual cylinder torque of the enleaned cylinder is estimated at 512.

At 513, confidence factors are determined for each type of estimation performed at 512. For example, a first confidence factor is determined for the variation in exhaust AFR; a second confidence factor is determined for the variation in the exhaust pressure; and a third confidence factor is determined for the variation in cylinder torque. The confidence factors may be determined based on engine operating conditions, similar to step 306 in FIG. 3. For example, the third confidence factor may be set higher than the first confidence factor, because cylinder torque is more sensitive to AFR imbalance during lean operation.

At 514, a lean outlier is identified based on the variation estimated in step 512 and confidence factor determined at step 513. For example, each of the variations estimated in step 512 is weighted by corresponding confidence factors determined at step 513. For each cylinder, a summation of the weighted exhaust AFR, weighted exhaust pressure, and weighted cylinder torque is calculated. Then, a deviation of the summation for each cylinder from the mean of the summations for all cylinders is calculated. As an example, a cylinder with the largest deviation is identified as a lean outlier. As another example, one or more cylinders having a deviation larger than a predetermined threshold are identified as lean outliers. The diagnostic code for the lean outliers are updated similar to step 310 in FIG. 3. Routine 500 then moves on to 515.

At 515, routine 500 determines if a rich outlier should be identified. As an example, the rich outlier may be identified when the engine operation will not be significantly affected by enleaning all the cylinders. If the answer at 515 is YES, routine 500 moves to 516, wherein the AFR is enleaned for all cylinders. If the answer at 515 is NO, routine 500 moves to 521, wherein the diagnostic code is unchanged.

At 516, the method includes enleaning all cylinders by increasing the combustion AFR. In response to the increased AFR, variation in exhaust AFR, exhaust pressure, and individual cylinder torque for each cylinder is estimated at 517.

At 518, similar to step 512, confidence factors are determined for each type of estimation performed in 517. The confidence factors may be determined based on engine operating conditions, similar to step 306 in FIG. 3. For example, the first confidence factor may be set higher than the third confidence factor, because exhaust AFR is more sensitive to AFR imbalance during rich operation.

At 519, similar to step 514, the rich outlier is identified based on the variation estimated in step 517 and confidence factors determined at step 518. For example, each of the variation estimated in step 517 is weighted by corresponding confidence factors determined at step 518. For each cylinder, a summation of the weighted exhaust AFR, weighted exhaust pressure, and weighted cylinder torque is calculated. Then, a deviation of the summation for each cylinder from the mean of the summations for all cylinders is calculated. As an example, cylinder with the largest deviation is identified as rich outlier. As another example, the one or more cylinders which have a deviation larger than a predetermined threshold are identified as rich outliers. The diagnostic code for the rich outliers are updated similar to step 310 in FIG. 3.

Finally, at 522, similar to step 311 in FIG. 3, AFR is corrected for the one or more imbalanced cylinders.

Turning to FIG. 6, routine 600 shows an example method for determining the engine torque in response to each cylinder firing event using a laser torque sensor or a magnetic torque sensor. Both laser torque sensor 200 and magnetic torque sensor 210 shown in FIGS. 2A and 2B can measure the crankshaft position at two locations along the crankshaft. The difference between the measured crankshaft positions at the two locations corresponds to a phase delay between the two position signals. Therefore, the difference between the measured crankshaft positions may also be referred to herein as a phase delay value.

At 601, routine 600 determines if a calibration under zero torque has been performed. If the calibration has been performed, routine 600 moves to 604, wherein a stored phase delay value is read. For example, the phase delay may be stored in the controller's memory and retrieved from the memory. If the calibration has not been performed, routine 600 moves to 602 for calibration. Further, calibration may be performed if a threshold duration has elapsed since a last calibration.

At 602, routine 600 determines if zero torque is applied to the crankshaft. As an example, zero torque may be applied to the crankshaft during an engine-off condition. As another example, zero torque may be applied to the crankshaft during engine idling. If the crankshaft is under zero torque, the method includes reading and storing (in the controller's memory) the current phase delay value from the torque sensor at step 605. If the torque applied to the crankshaft is non-zero, routine 600 indicates that the cylinder torque measurement is not available.

After acquiring the phase delay value for zero torque at step 604 or 605, routine 600 moves to 606 to determine if a cylinder firing event is occurring. In response to the cylinder firing event, routine 600 moves to 608 to estimate the cylinder torque. If no firing event has occurred, routine 600 continues monitoring cylinder firing events at 607.

At 608, a phase delay value in response to cylinder firing is determined based on a time delay and speed of the crankshaft. Specifically, the time delay between the two locations along the crankshaft is measured by the torque sensor. As an example, at time $t_0$, the torque sensor records an encoder pattern at the first location. Subsequently, at time $t_1$, the same encoder pattern is recorded at the second location. The time delay dt is then determined as $dt=t_1-t_0$. The phase delay value (phi) after cylinder firing is calculated as:

$$phi=360 \times dt/r \quad \text{(equation 3)},$$

wherein r is the rotation speed of the crankshaft.

At 609, crankshaft twist is estimated by subtracting the phase delay value for zero torque from the phase delay value calculated at step 608.

Finally at 610, engine torque after cylinder firing is estimated based on the crankshaft twist estimated at 609 and further based on crankshaft temperature. As an example, crankshaft temperature may be inferred based on cylinder head temperature. As another example, if the torque sensor is a laser torque sensor, crankshaft temperature may be measured by operating the laser detector at infrared wavelength. The cylinder torque values estimated using the laser or magnetic torque sensor may then be applied for cylinder imbalance estimation, as discussed above with reference to FIGS. 3-4.

In this way, multiple air-fuel ratio imbalance estimations may be conducted in response to varying operating conditions over an engine drive cycle. A combined imbalance parameter is then calculated by weighting each estimation by a confidence factor determined based on the operating condition at which the estimated is conducted. As such, the combined imbalance parameter may provide a more reliable identification of cylinder imbalance as compared to any single imbalance estimation. Thus, the shortcomings of each estimation may be overcome. Moreover, cylinder imbalance diagnoses may be performed at a broader range of engine operating conditions, while reducing the total diagnosis time. By identifying cylinder imbalance in a faster and more reliable manner, torque disturbances from cylinder imbalance may be addressed in a more timely fashion. As such, this improves engine fuel economy and performance, as well as vehicle driveability.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
an engine;
a direct injector for injecting fuel directly into an engine cylinder;
a port injector for injecting fuel into an intake port upstream of the engine cylinder;
an exhaust gas sensor for estimating an exhaust air-fuel ratio;
a pressure sensor for estimating an exhaust manifold pressure;
a crankshaft torque sensor coupled to a crankshaft for estimating individual cylinder torque; and
a controller configured with computer readable instructions stored on non-transitory memory to:
determine each of a first confidence factor of the estimated exhaust air-fuel, a second confidence factor of the estimated exhaust pressure, and a third confidence factor of the estimated individual cylinder torque based on operating conditions;

indicate cylinder-to-cylinder imbalance based on two or more of the estimated exhaust air-fuel ratio weighted by the first confidence factor, the estimated exhaust manifold pressure weighted by the second confidence factor, and the estimated individual cylinder torque weighted by the third confidence factor; and apply an air-fuel ratio correction to one or more cylinders based on the indication.

2. A method for an engine, comprising:

supplying fuel to an engine cylinder via a combination of a direct injector and a port injector; and indicating cylinder-to-cylinder imbalance based on each of exhaust air-fuel ratio estimated by an exhaust gas sensor, exhaust manifold pressure estimated by a pressure sensor, and individual cylinder torque estimated by a crankshaft torque sensor.

3. The method of claim 2, wherein each of the exhaust air-fuel ratio, exhaust manifold pressure, and individual cylinder torque are estimated at different operating conditions over a given drive cycle.

4. The method of claim 2, wherein the indicating cylinder-to-cylinder imbalance includes weighting each of the estimated exhaust air-fuel ratio, the estimated exhaust manifold pressure, and the estimated individual cylinder torque with a confidence factor based on an operating condition at which the estimating was performed.

5. The method of claim 4, wherein the confidence factor is further based on a type of the estimating.

6. The method of claim 4, wherein the confidence factor is further based on a composition of the fuel.

7. The method of claim 4, wherein the confidence factor is different for each cylinder of the engine.

8. The method of claim 4, wherein the weighting includes weighting the estimated exhaust air-fuel ratio with a first confidence factor, weighting the estimated exhaust manifold pressure with a second confidence factor, and weighting the individual cylinder torque with a third confidence factor.

9. The method of claim 8, wherein a sum of the first, second, and third confidence factors is maintained at a constant value over different drive cycles.

10. The method of claim 4, further comprising calculating, for each engine cylinder, a combined imbalance parameter based on the weighted exhaust air-fuel ratio, the weighted exhaust manifold pressure, and the weighted individual cylinder torque.

11. The method of claim 2, wherein the confidence factor applied during an engine cold-start condition is different from the confidence factor applied during engine idle steady-state condition.

12. The method of claim 2, further comprising, in response to the indication, applying an air-fuel ratio correction to an imbalanced cylinder.

13. The method of claim 12, wherein the air-fuel ratio correction includes a corrected fuel injection amount, and wherein applying the air-fuel ratio correction includes:

adjusting a pulse-width of a fuel injector actuator to provide the corrected fuel injection amount.

14. A method for an engine, comprising:

supplying fuel to an engine cylinder via a direct injector and a port injector; and indicating cylinder-to-cylinder imbalance based on exhaust air-fuel ratio estimated by an exhaust gas sensor during a first condition, exhaust manifold pressure estimated by a pressure sensor during a second condition, and individual cylinder torque estimated by a crankshaft torque sensor during a third condition.

15. The method of claim 14, wherein the first, second, and third condition are mutually exclusive to each other.

16. The method of claim 14, wherein the indicating is further based on the exhaust air-fuel ratio weighted by a first confidence factor, the exhaust pressure weighted by a second confidence factor, and the individual cylinder torque weighted by a third confidence factor.

17. The method of claim 14, wherein the first condition includes engine steady-state operation with known fuel type.

18. The method of claim 14, wherein the second condition includes engine steady-state operation and the variation in valve timing is within a threshold.

19. The method of claim 14, wherein the third condition includes an engine cold-start condition.

20. The method of claim 14, further comprising:

during the first condition, in response to the imbalance, adjusting an air-fuel ratio of an imbalanced cylinder via fuel adjustments, during the second condition, in response to the imbalance, adjusting the air-fuel ratio of an imbalanced cylinder via intake air adjustments, and during the third condition, in response to the imbalance, adjusting the air-fuel ratio of the imbalanced cylinder via both fuel and intake air adjustments.

\* \* \* \* \*